US011358210B2

(12) United States Patent
Singh et al.

(10) Patent No.: US 11,358,210 B2
(45) Date of Patent: Jun. 14, 2022

(54) SWAGING TOOL AND METHOD OF MANUFACTURING SAME

(71) Applicant: EATON INTELLIGENT POWER LIMITED, Dublin (IE)

(72) Inventors: Tanul Singh, Maharashtra (IN); Christopher T. Cantrell, Jackson, MI (US); Emmanuel Matthews, Laurel, MD (US); Srinivasan A. Tekalur, Okemos, MI (US); Lucas Stahl, Livonia, MI (US); David St. John, Detroit, MI (US); Gregory Kiernan, Grass Lake, MI (US)

(73) Assignee: Eaton Intelligent Power Limited, Dublin (IE)

( * ) Notice: Subject to any disclaimer, the term of this patent is extended or adjusted under 35 U.S.C. 154(b) by 229 days.

(21) Appl. No.: 15/989,626

(22) Filed: May 25, 2018

(65) Prior Publication Data

US 2018/0339333 A1 Nov. 29, 2018

Related U.S. Application Data

(60) Provisional application No. 62/511,624, filed on May 26, 2017.

(51) Int. Cl.
*B21J 7/18* (2006.01)
*B25B 27/10* (2006.01)
*B33Y 10/00* (2015.01)
*B21D 39/04* (2006.01)

(52) U.S. Cl.
CPC ............... *B21J 7/18* (2013.01); *B25B 27/10* (2013.01); *B33Y 10/00* (2014.12); *B21D 39/046* (2013.01)

(58) Field of Classification Search
CPC .... B21D 39/04; B21D 39/046; B21D 39/048; F16L 13/14; F16L 13/141; F16L 13/146; F16L 2013/145; B25B 27/02; B25B 27/10; Y10T 29/49826; Y10T 29/5367; Y10T 29/5383; Y10T 29/53987; B21J 7/18; B21J 9/06
USPC .................. 29/237, 282, 283.5; 72/412, 416
See application file for complete search history.

(56) References Cited

U.S. PATENT DOCUMENTS

| | | | | |
|---|---|---|---|---|
| 3,823,597 A | * | 7/1974 | Hanback | B21D 39/046 72/402 |
| 5,398,394 A | * | 3/1995 | Hyatt | B21D 39/04 29/237 |
| 5,592,726 A | * | 1/1997 | Suresh | B21D 39/04 29/237 |
| 5,694,670 A | * | 12/1997 | Hosseinian | B21D 39/04 29/237 |

(Continued)

*Primary Examiner* — Shelley M Self
*Assistant Examiner* — Katie L. Parr
(74) *Attorney, Agent, or Firm* — Merchant & Gould P.C.

(57) ABSTRACT

A method of manufacturing a swaging tool includes forming a body of the swaging tool via additive manufacturing, forming a jaw of the swaging tool, and connecting the jaw with the body. Forming the body may include providing a portion of the body with a lattice structure. The portion may be internal and may not be externally accessible. Forming the body may include adding material to form at least one recess in an outer surface of the body. The method may include conducting a stress analysis. The at least one recess may be formed based on or according to the stress analysis.

19 Claims, 16 Drawing Sheets

(56) References Cited

U.S. PATENT DOCUMENTS

| | | | | |
|---|---|---|---|---|
| 6,430,792 B1* | 8/2002 | Foster | ............... | B21D 39/046 |
| | | | | 29/237 |
| 6,619,101 B1* | 9/2003 | Faucher | ............... | B25B 27/10 |
| | | | | 72/416 |
| 9,604,273 B1* | 3/2017 | Hogan | ............... | B21D 39/046 |
| 10,400,921 B2* | 9/2019 | Suresh | ............... | F16L 13/146 |
| 2003/0167614 A1* | 9/2003 | Morrison | ............... | B25B 27/10 |
| | | | | 29/237 |
| 2005/0081359 A1* | 4/2005 | Palejwala | ............... | B25B 27/10 |
| | | | | 29/516 |
| 2009/0300917 A1* | 12/2009 | Hwang | ............... | B25B 27/10 |
| | | | | 29/890.15 |
| 2012/0030917 A1* | 2/2012 | Danhash | ............... | B21D 39/04 |
| | | | | 29/237 |
| 2012/0255183 A1* | 10/2012 | Myrhum, Jr. | ............... | B26F 1/34 |
| | | | | 30/360 |
| 2014/0237797 A1* | 8/2014 | Danhash | ............... | B25B 27/10 |
| | | | | 29/428 |
| 2016/0325337 A1* | 11/2016 | Suresh | ............... | B25B 27/10 |
| 2017/0057040 A1* | 3/2017 | Rzasa | ............... | B25B 27/10 |
| 2017/0184086 A1* | 6/2017 | Scancarello | ............... | F04B 39/0284 |
| 2018/0168724 A1* | 6/2018 | Guler | ............... | A61B 18/1492 |

* cited by examiner

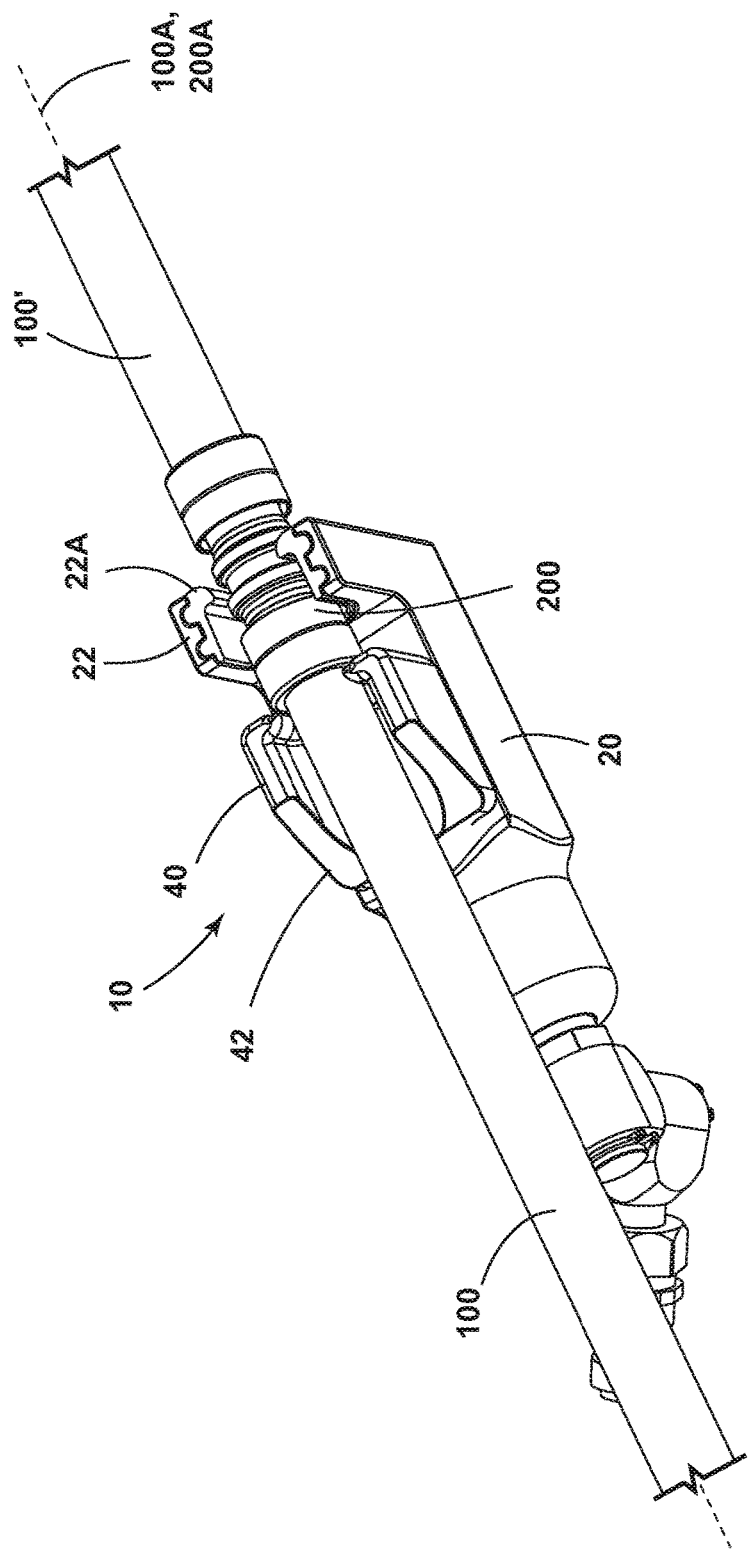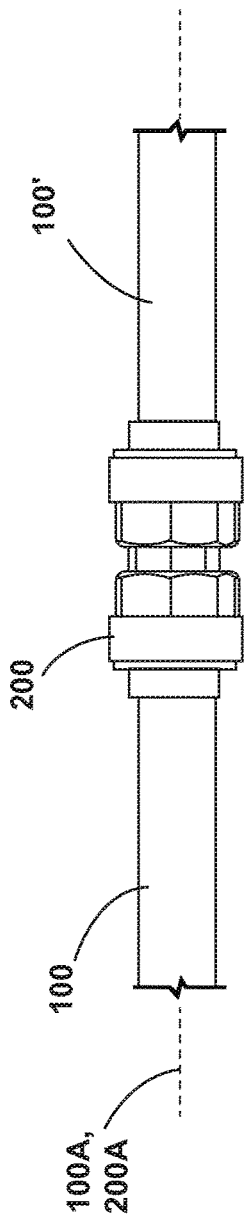
FIG. 1A
FIG. 1B

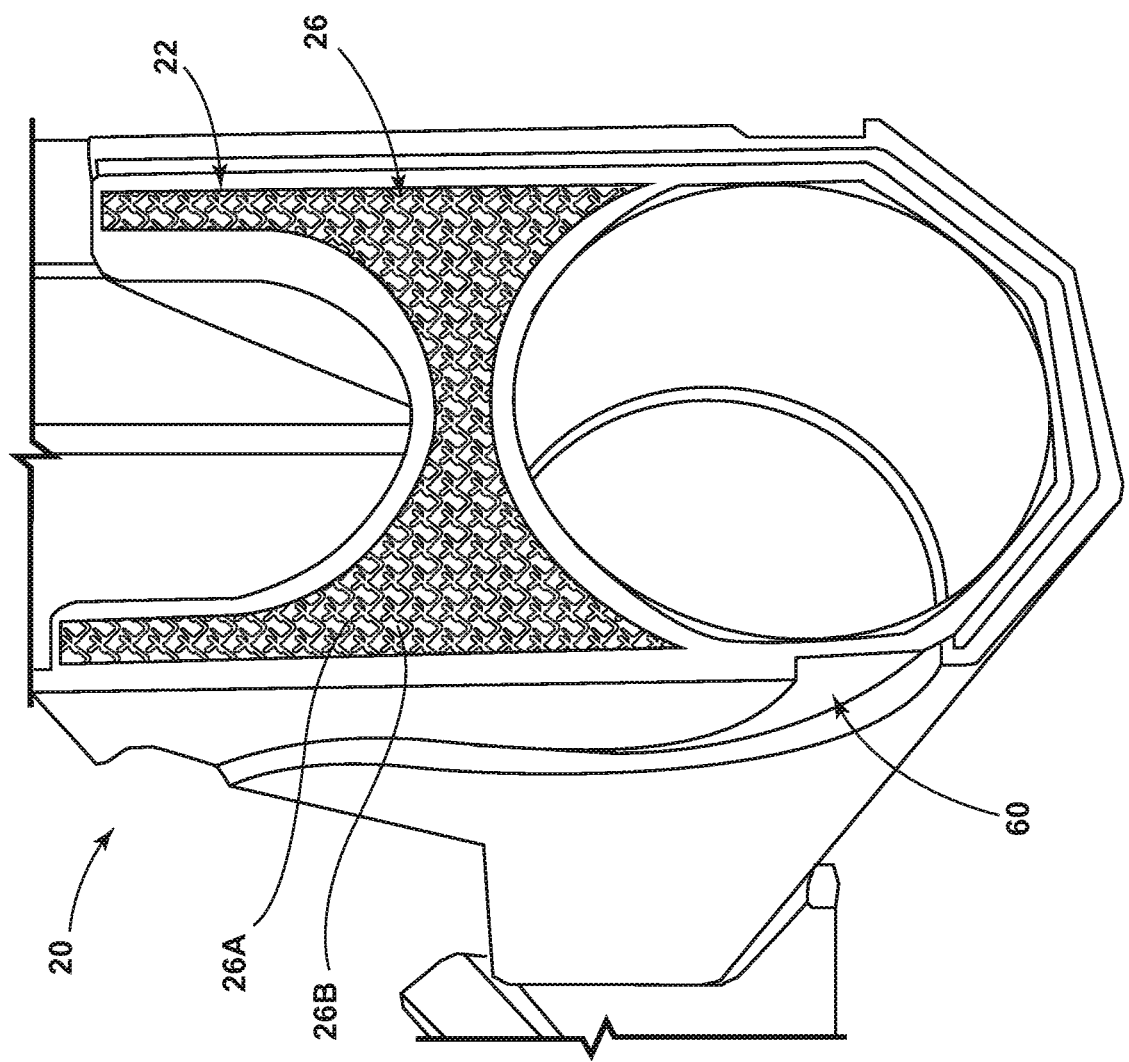

SWAGING TOOL AND METHOD OF MANUFACTURING SAME

CROSS-REFERENCE TO RELATED APPLICATION

This application claims the benefit of U.S. Provisional Patent Application Ser. No. 62/511,624, filed on May 26, 2017, the disclosure of which is hereby incorporated herein by reference in its entirety.

TECHNICAL FIELD

The present disclosure relates to swaging, swaging tools, and methods of manufacturing swaging tools.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

In some instances, it may be desirable to connect a fluid conduit with a fitting, such as to connect the fluid conduit with another fluid conduit. Swaging tools may be used to connect fluid conduits with fittings. It may be desirable for swaging tools to be relatively lightweight, efficient, and/or inexpensive.

There is a desire for solutions/options that minimize or eliminate one or more challenges or shortcomings of swaging tools and methods of manufacturing swaging tools. The foregoing discussion is intended only to illustrate examples of the present field and should not be taken as a disavowal of scope.

SUMMARY

In embodiments, a method of manufacturing a swaging tool may include forming a body of the swaging tool via additive manufacturing, forming a jaw of the swaging tool, and/or connecting the jaw with the body. Forming the body may include providing a portion of the body with a lattice structure (e.g., an internal lattice structure). The portion may be internal and may not be externally accessible. Forming the body may include adding material to form at least one recess in an outer surface of the body. The method may include conducting a stress analysis. The method may include forming the at least one recess based on or according to the stress analysis.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIG. 1A is a perspective view of an embodiment of a swaging tool according to teachings of the present disclosure.

FIG. 1B is a side view of an embodiment of a swaged connection according to teachings of the present disclosure.

FIGS. 3A, 3B, and 3C are cross-sectional views of bodies of embodiments of swaging tools according to teachings of the present disclosure.

DETAILED DESCRIPTION

Figure 2A:
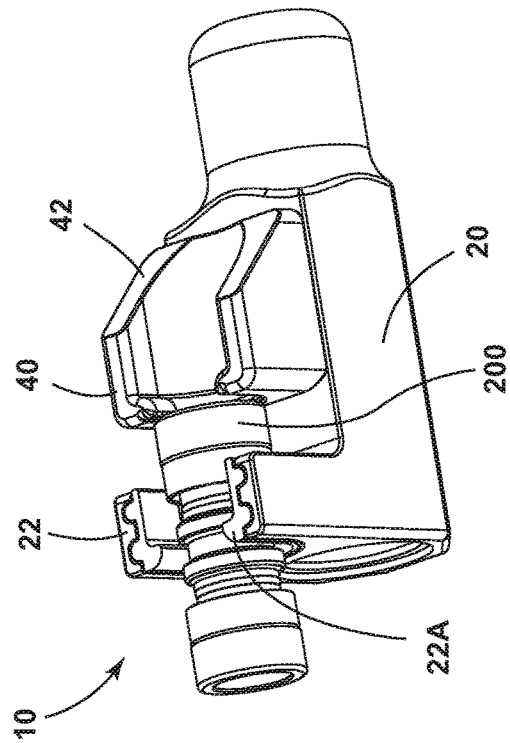
FIGS. 2A, 2B, and 2C are perspective views of embodiments of swaging tools according to teachings of the present disclosure.
Figure 2B:
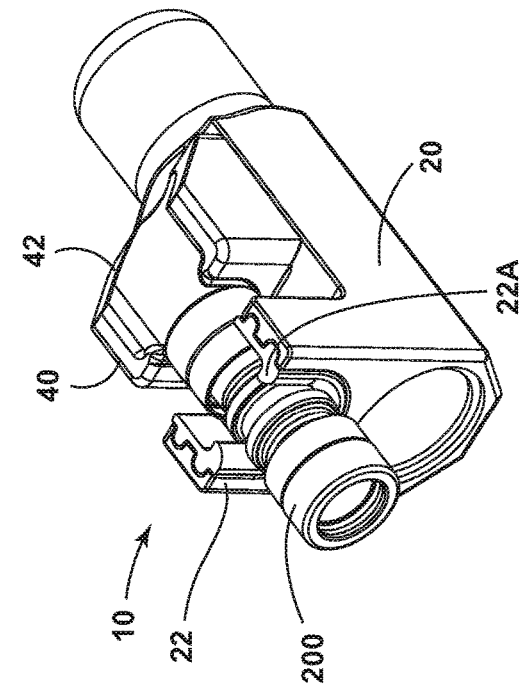
Figure 2C:
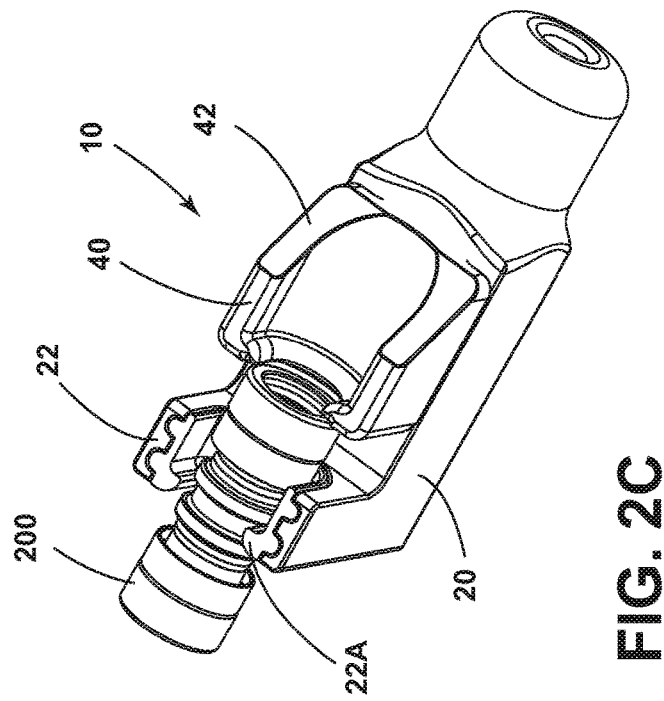

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

In embodiments, such as generally illustrated in FIGS. 1A, 2A, 2B, 2C, and 2D, a swaging tool 10 may include a body 20 and/or a jaw 40. Swaging tool 10 may be configured to connect a fluid conduit 100, 100' with a fitting 200 (see, e.g., FIGS. 1A and 1B). Body 20 may include a retainer 22 that may be configured to retain at least a portion of one of a fluid conduit 100, 100' and a fitting 200. Jaw 40 may be configured to retain/hold at least one of a fluid conduit 100, 100' and a fitting 200. Jaw 40 may be movably connected with body 20. Jaw 40 may be configured to selectively move toward retainer 22. For example and without limitation, jaw 40 may hold a fluid conduit 100 and may move fluid conduit 100 into contact/engagement with a fitting 200 held by retainer 22. Continued movement of jaw 40 toward fitting 200 and/or retainer 22 while jaw 40 holds fluid conduit 100 may cause swaging of fluid conduit 100 with fitting 200. Swaging may include altering (e.g., increasing) a diameter of fluid conduit 100 into a sealing engagement with fitting 200.

With embodiments, a body 20 and a jaw 40 may include one or more of a variety of shapes, sizes, configurations, and/or materials. Body 20 may, for example, include a generally cylindrical shape. Retainer 22 may include a portion having a generally U-shaped configuration that may extend perpendicularly with respect to a remainder of body 20 and may open outwardly (e.g., radially). A swaging tool 10 may include one or more inserts 22A (e.g., U-shaped inserts) that may be configured for connection with retainer 22. Inserts 22A may be configured to retain fittings 200 of different sizes. For example and without limitation, a swaging tool 10 may include interchangeable/modular inserts 22A for each expected fitting size (e.g., AN-4, -6, -8, -10, among others). Additionally or alternatively, jaw 40 may include a plurality of configurations, such as a configuration for each fitting size. Body 20 may include a plurality of configurations and may be configured to be utilized with a plurality of fittings 200. For example and without limitation, the same configuration of body 20 may be used with AN-4 and AN-6 fittings and another configuration of body 20 may be used with AN-8 and AN-8 fittings.

In embodiments, a jaw 40 may include a portion having a generally U-shaped configuration. Jaw 40 may be aligned with retainer 22 such that central axes 100A, 200A of fluid conduit 100 and fitting 200 are aligned when fluid conduit 100 and fitting 200 are held by retainer 22 and jaw 40 (see, e.g., FIGS. 1A and 1B). Jaw 40 may include a tapered portion 42 that may be disposed at or toward a rear end or portion of jaw 40 (e.g., away from retainer 22).

Figure 2D:
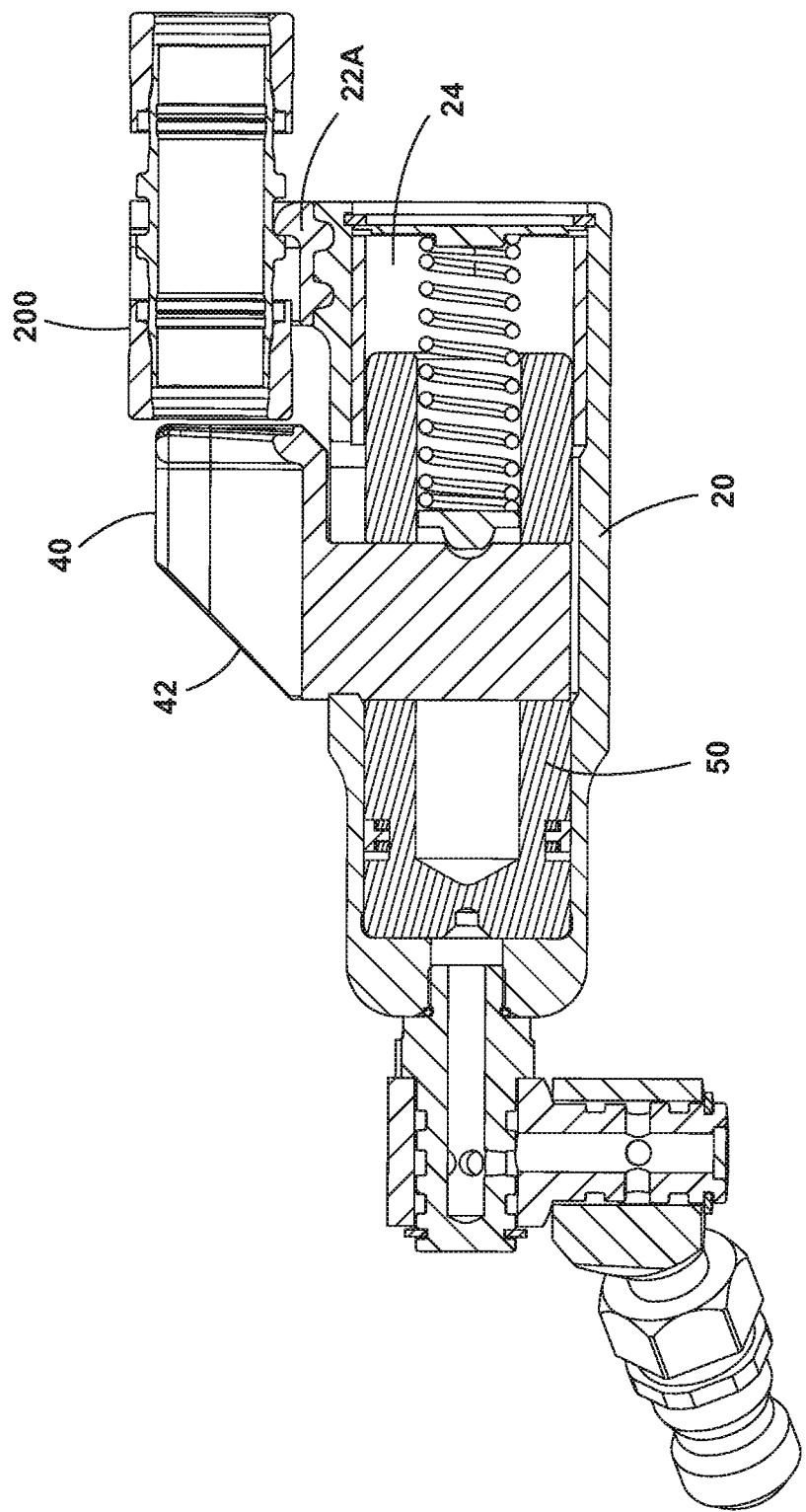
FIG. 2D is a cross-sectional view of an embodiment of a swaging tool according to teachings of the present disclosure.

In embodiments, such as generally illustrated in FIG. 2D, a swaging tool 10 may include an actuator 50 that may be connected to body 20 and/or jaw 40. Actuator 50 may be configured to move or translate jaw 40 relative to body 20. Actuator 50 may include, for example, a pneumatic and/or hydraulic cylinder that may be disposed at least partially in a chamber 24 (e.g., an internal chamber) of body 20.

With embodiments, such as generally illustrated FIGS. 3A, 3B, 3C, 4, 5, 6, 7, 7A, and 7B, a swaging tool 10 may be manufactured, at least partially, via additive manufacturing, which may include and/or be referred to as three-dimensional (3D) printing. For example and without limitation, swaging tool 10 may be manufactured via formation of a series of layers of material. Swaging tool 10 may comprise, for example, stainless steel (e.g., HP5-15) and may be manufactured, at least in part, via forming consecutive/adjacent layers of stainless steel. In embodiments, some or all adjacent layers may be different from each other.

Figure 3A:
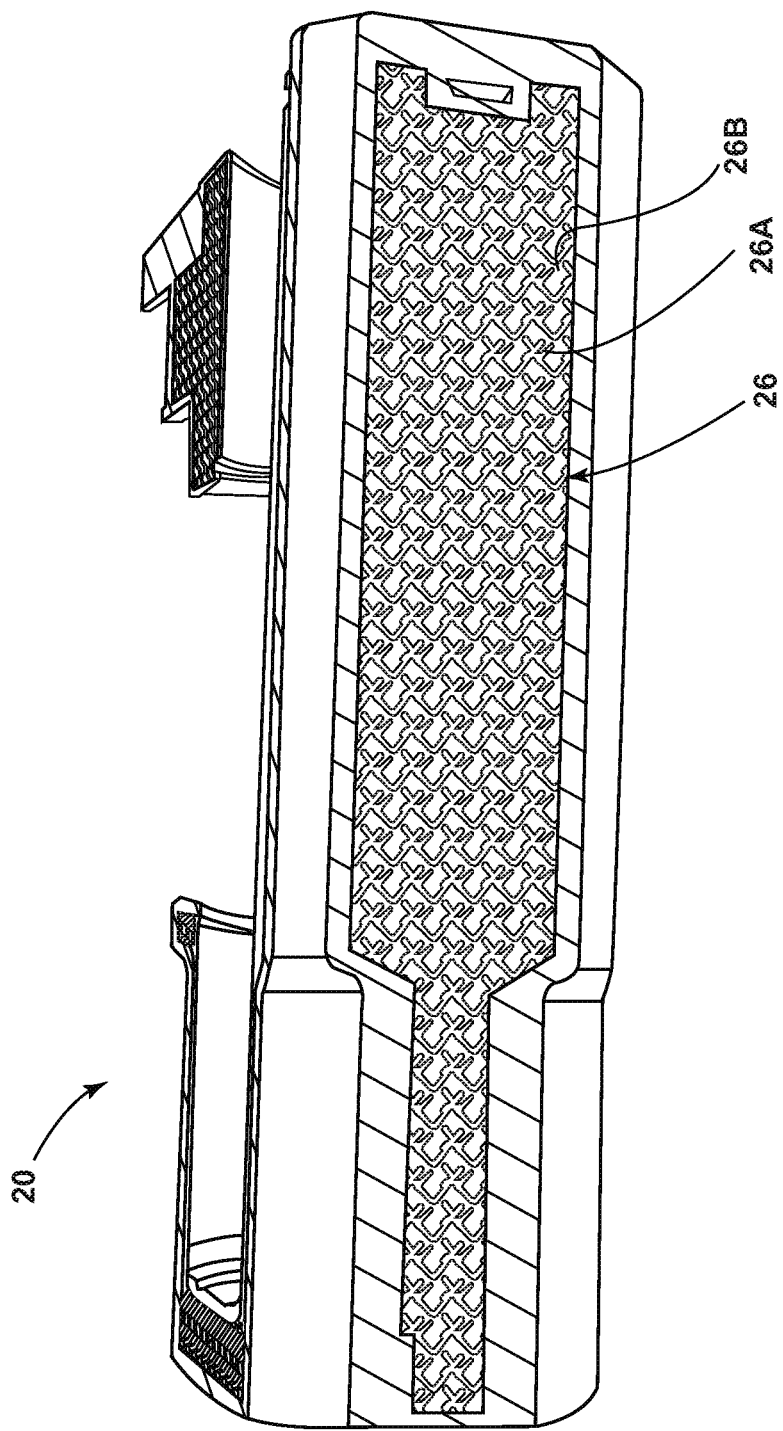
Figure 3B:
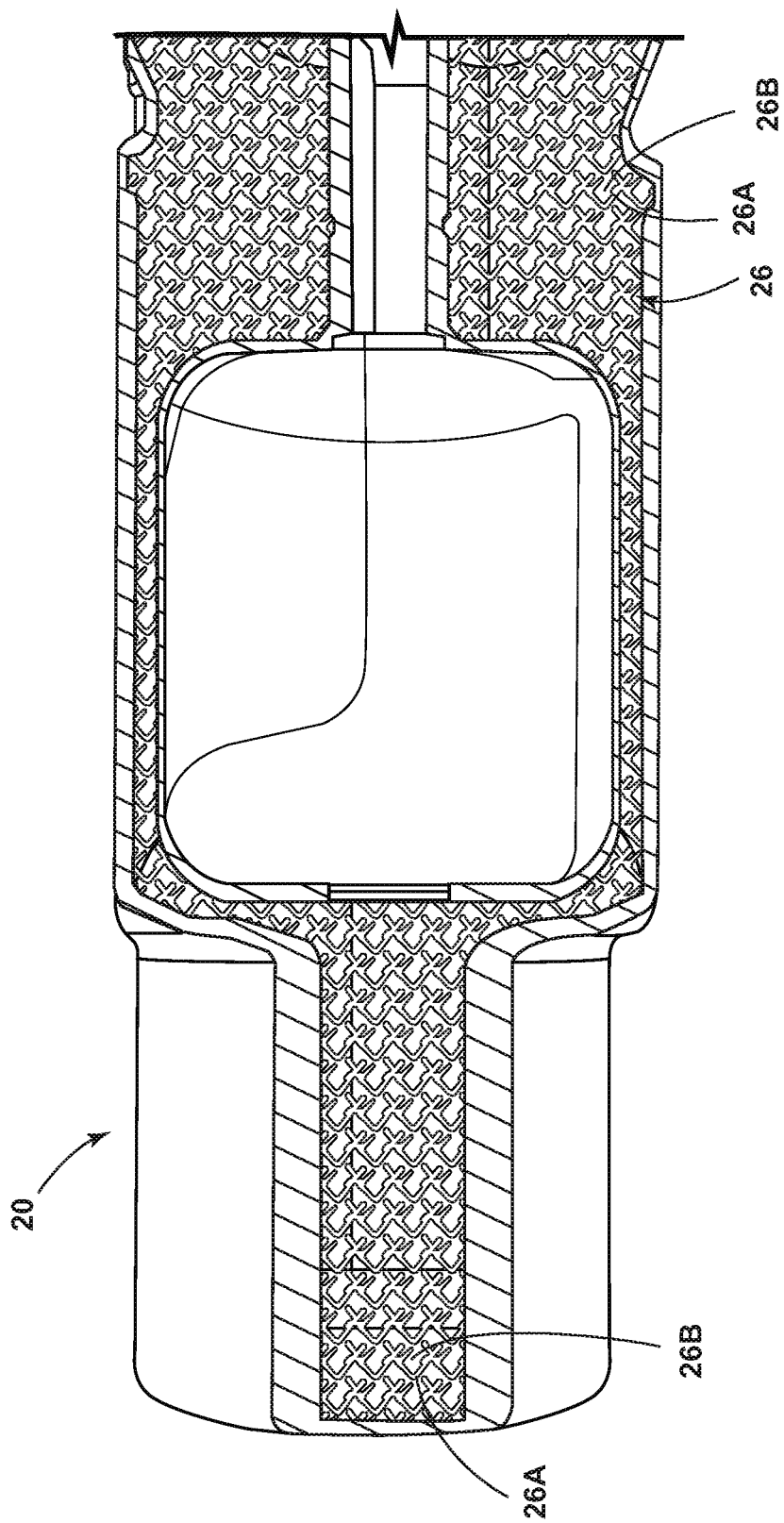
Figure 4:
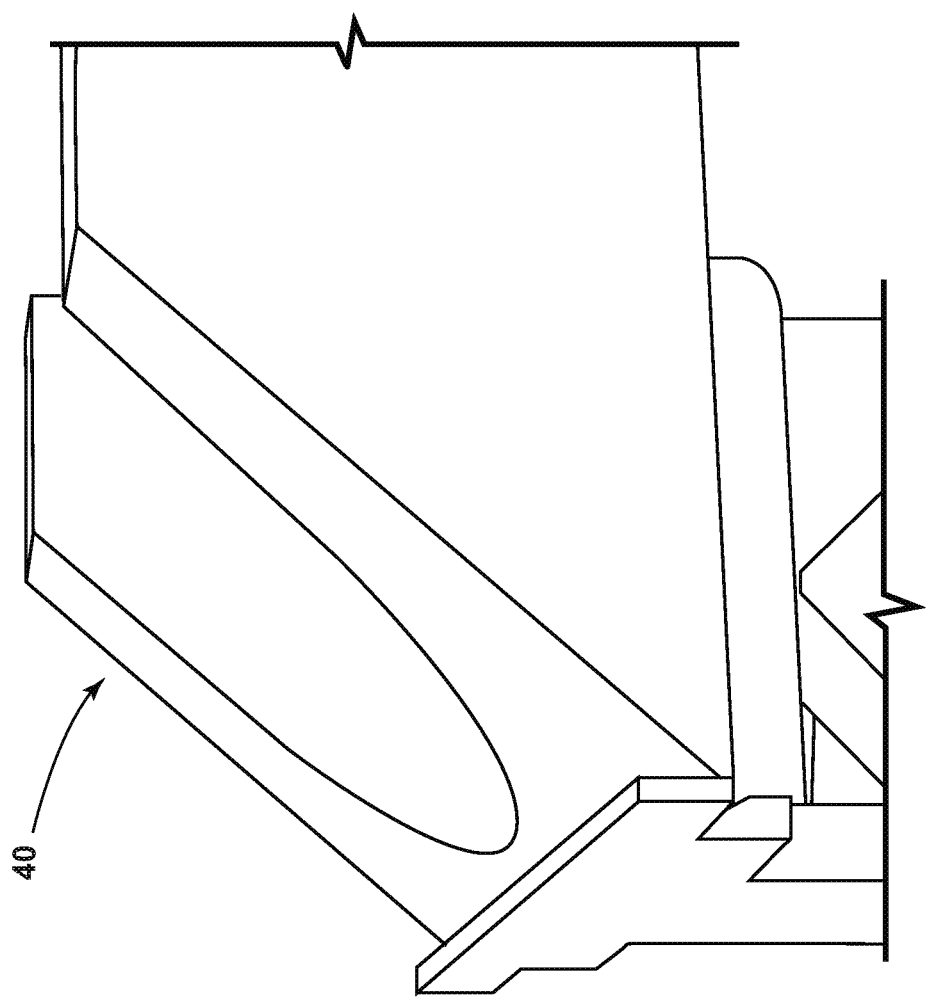
FIG. 4 is a perspective view of a jaw of an embodiment of a swaging tool according to teachings of the present disclosure.
Figure 5:
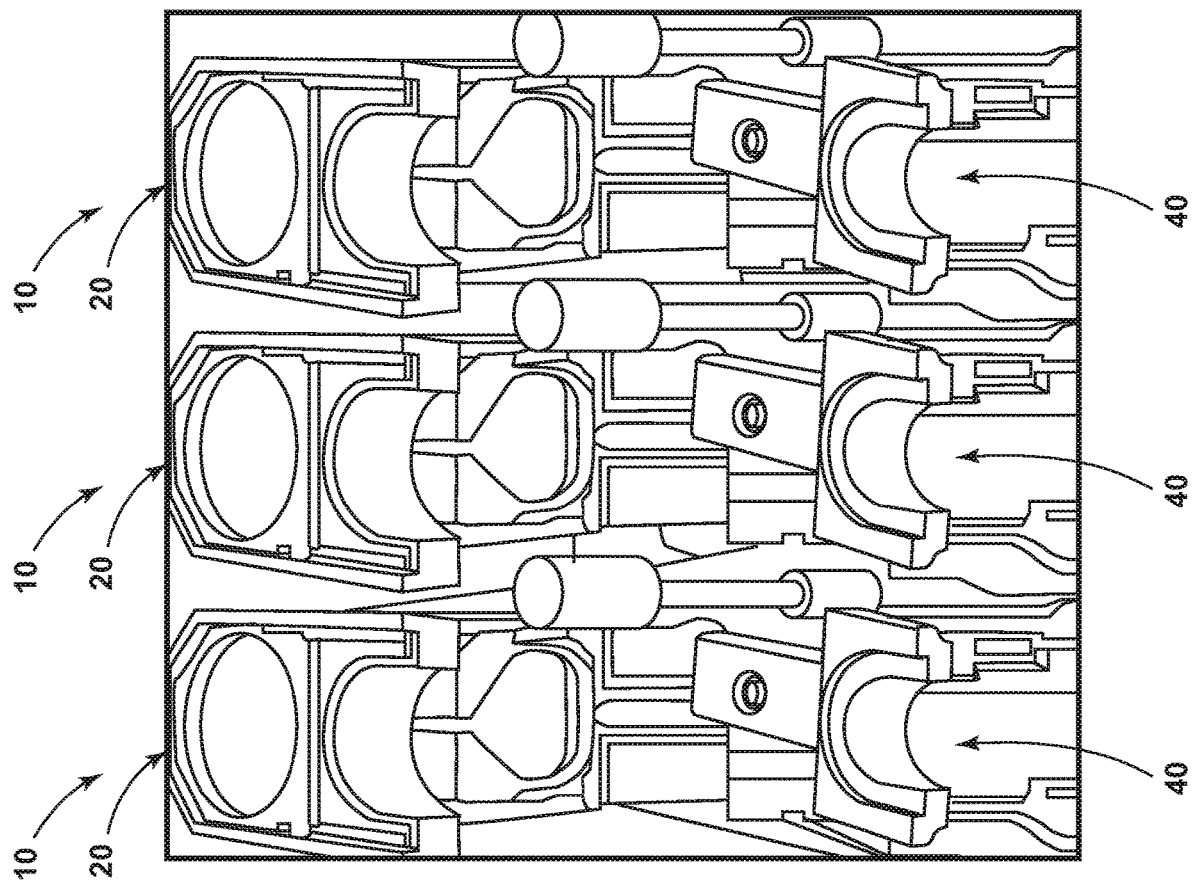
FIG. 5 is a perspective view of embodiments of swaging tools according to teachings of the present disclosure.
Figure 7:
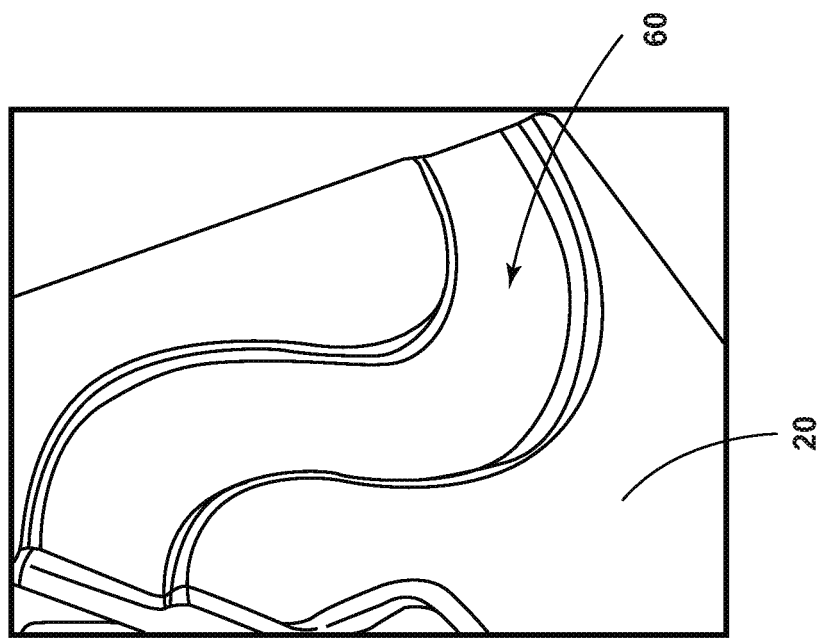
FIG. 7 is a perspective view of portions of an embodiment of a swaging tool according to teachings of the present disclosure.
Figure 6:
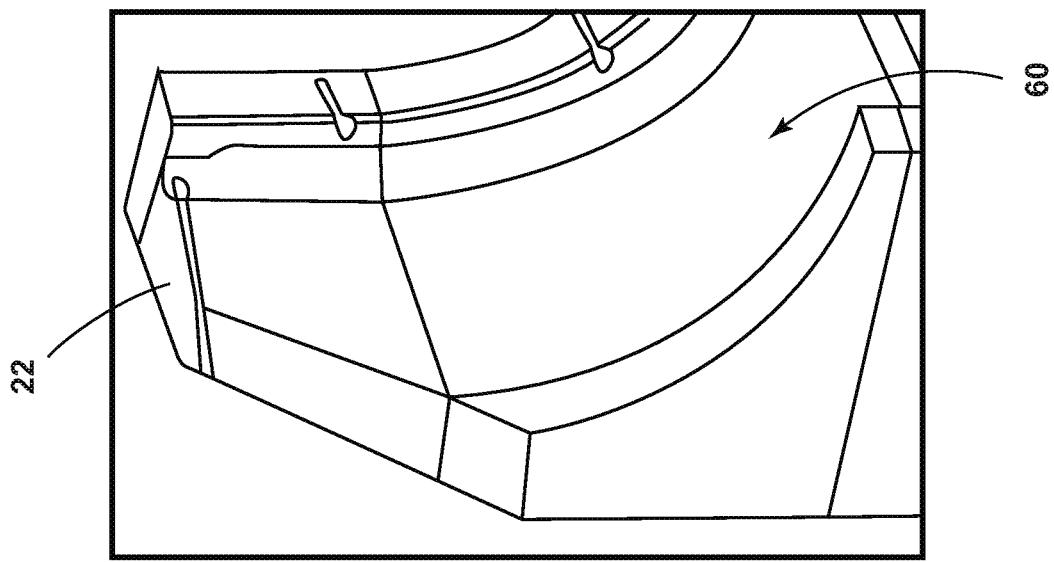
FIG. 6 is a cross-sectional perspective view of portions of an embodiment of a swaging tool according to teachings of the present disclosure.
Figure 7B:
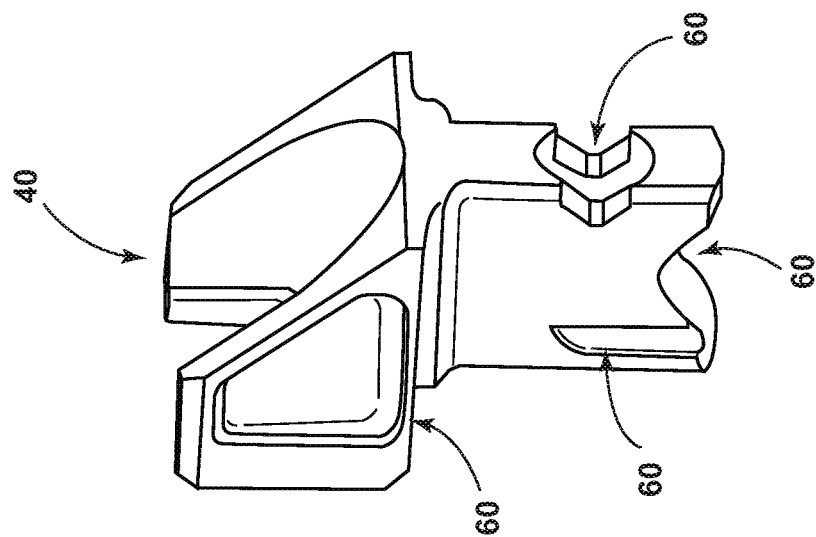
FIGS. 7A and 7B are perspective views of portions of embodiments of swaging tools according to teachings of the present disclosure.
Figure 7A:
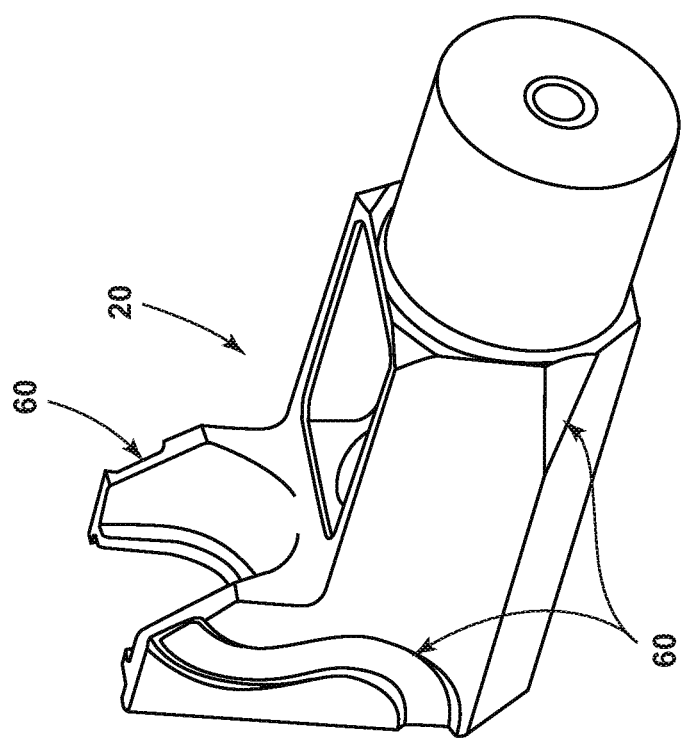

In embodiments, manufacturing of swaging tool 10 may include providing body 20 and/or jaw 40 with a lattice structure 26 via additive manufacturing. A lattice structure 26 of swaging tool 10 may be disposed within body 20 and/or jaw 40 such that lattice structure 26 is not externally visible or accessible (e.g., the lattice structures 26 shown in FIGS. 3A and 3B are cross-sectional views of the inside of examples of body 20 and an end portion of the example of FIG. 3C has been hidden/removed/not formed for the purpose of illustration). Outer portions/surfaces of body 20 may be formed via solid layers, such as to provide a continuous outer surface. Internal portions of body 20 may be formed of or via layers corresponding to lattice structure 26. For example, internal layers may include material sections 26A that may disposed in an alternating arrangement with gaps/apertures 26B. With embodiments, some layers may include discrete material sections 26A that are not connected, at least initially, with the rest of that particular layer. In embodiments, body 20 may be formed as a monolithic structure (e.g., a single, unitary component) that may include retainer 22.

With embodiments, such as generally illustrated in FIGS. 3C, 6, 7, 7A, and 7B, additive manufacturing of swaging tool 10 may include forming one or more recesses/depressions 60 in one or more portions of swaging tool 10, such as in body 20 and/or jaw 40. Including recesses/depressions 60 may reduce a total volume of material and/or weight of swaging tool 10. Recesses/depressions 60 may, for example, include an S-shaped configuration (see, for example and without limitation, FIGS. 7 and 7A). Swaging tool 10 may include internal and/or external recesses/depressions 60.

Figure 8:
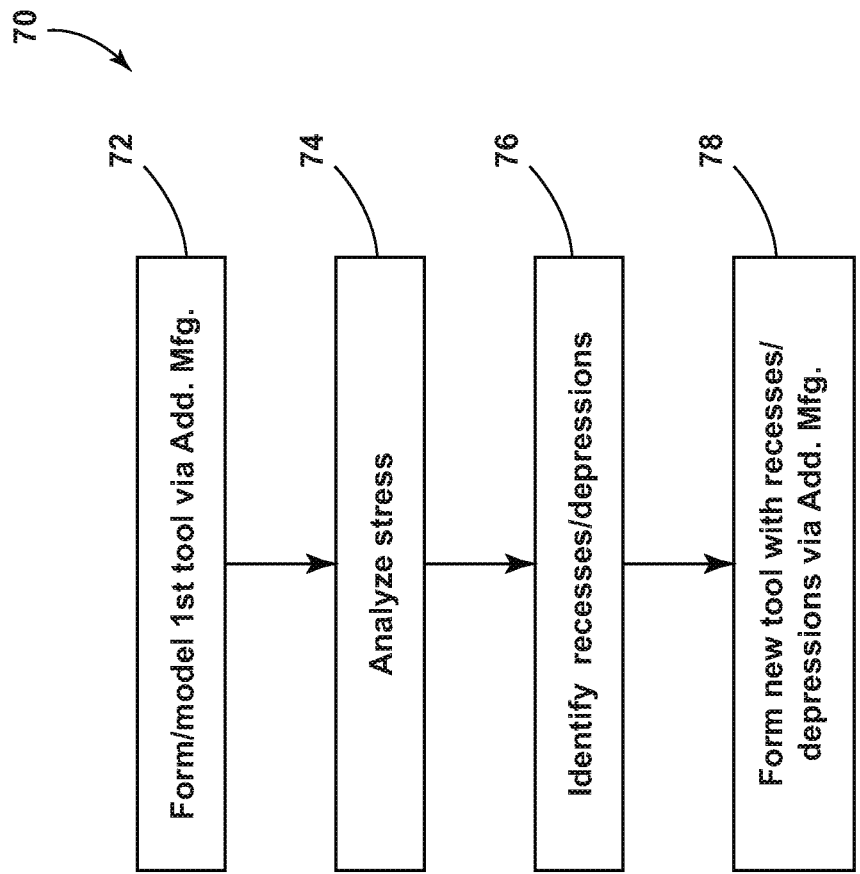
FIG. 8 is a flow diagram of an embodiment of a method of manufacturing a swaging tool according to teachings of the present disclosure.
Figure 9:
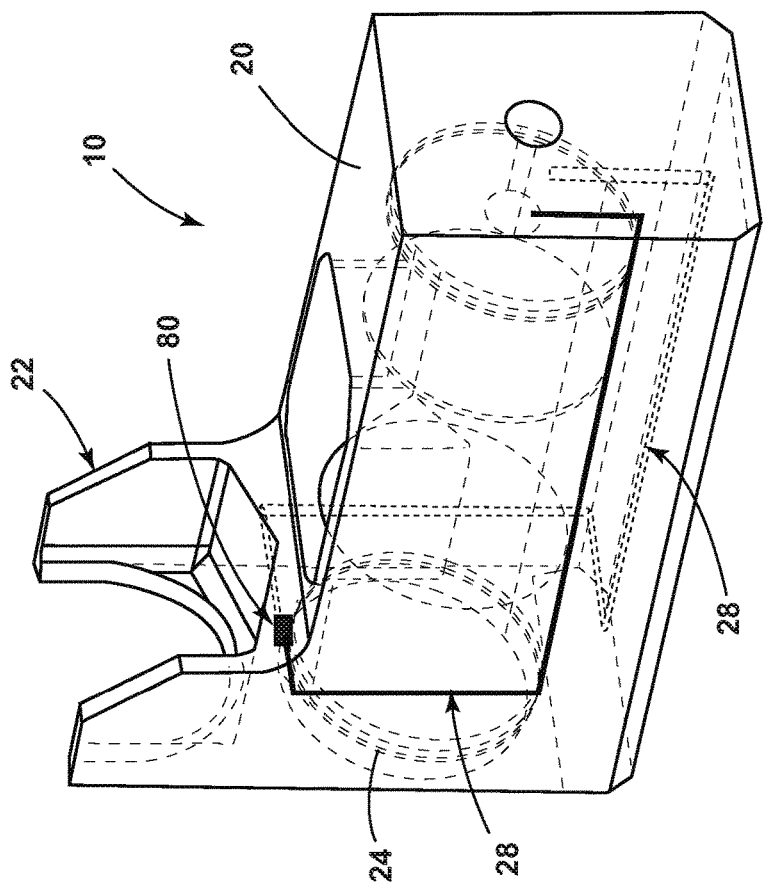
FIG. 9 is a perspective view of portions of an embodiment of a swaging tool according to teachings of the present disclosure.
Figure 9A:
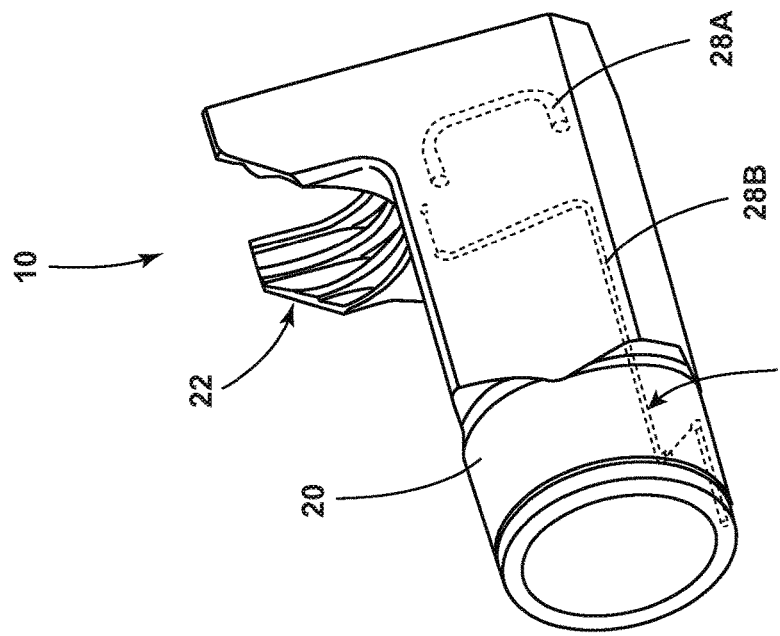
FIG. 9A is a perspective view of portions of an embodiment of a swaging tool according to teachings of the present disclosure.
Figure 9B:
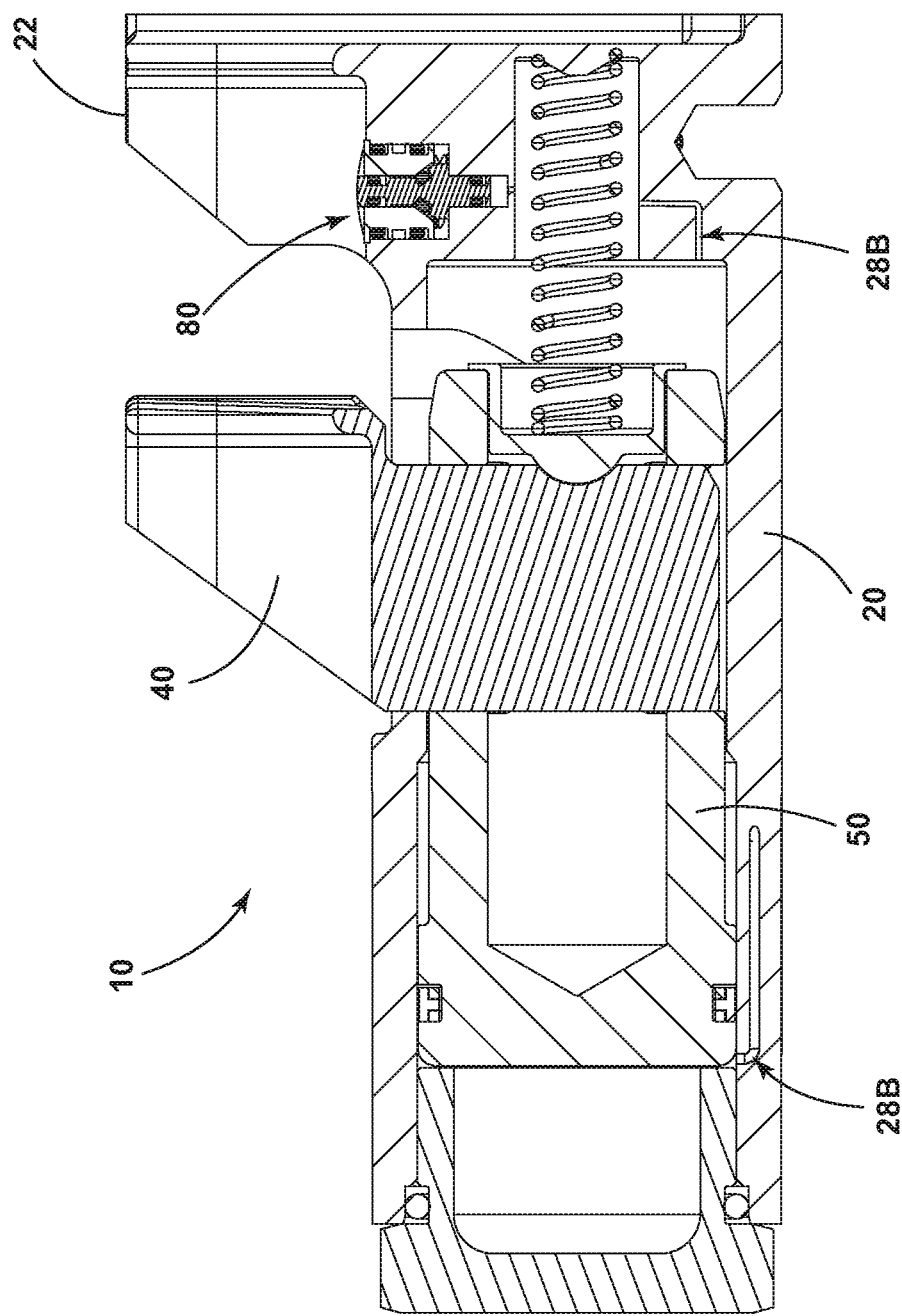
FIG. 9B is a cross-sectional view of an embodiment of a swaging tool according to teachings of the present disclosure.
Figure 9C:
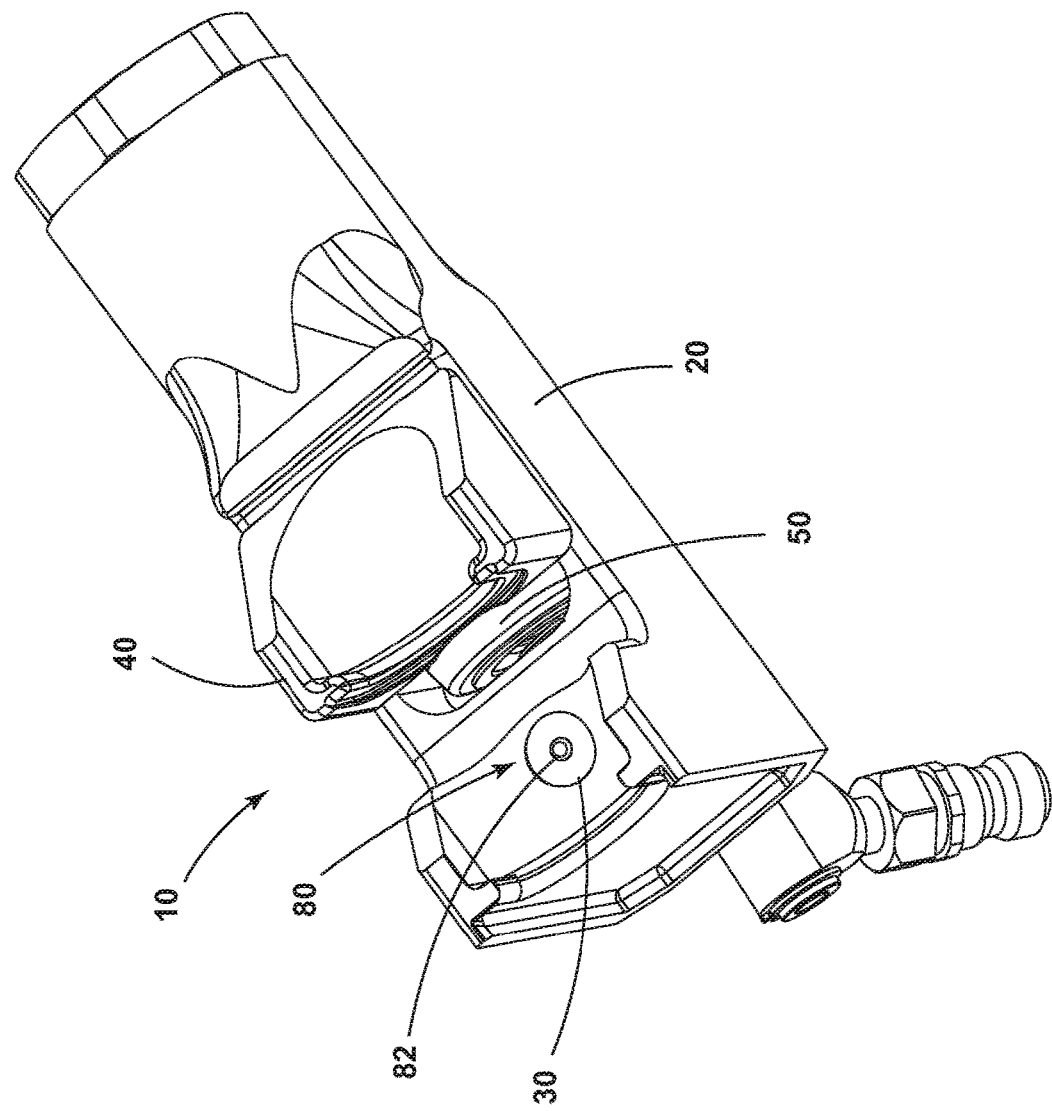
FIG. 9C is a perspective view of portions of an embodiment of a swaging tool according to teachings of the present disclosure.

As generally illustrated in FIG. 8, an embodiment of a method 70 of manufacturing swaging tool 10 may include forming recesses/depressions 60 according to or utilizing a stress analysis. For example and without limitation, a first swaging tool 10 may be manufactured (e.g., via additive manufacturing) and/or modeled (e.g., via a computer) in step 72, and the first swaging tool 10 (or model thereof) may or may not include any recesses/depressions 60. A stress analysis (e.g., a finite element analysis) may be performed, in step 74, on the first swaging tool/model 10 and areas/sections of swaging tool 10 that are not required for swaging tool 10 to tolerate expected stress and/or that could be reduced may be identified in step 76. In step 78, a new swaging tool 10 may be manufactured via additive manufacturing such that recesses/depressions 60 are formed in body 20 and/or jaw 40, which may include layers being formed without material in designated recess/depression areas (e.g., material may never have been present in recesses/depressions 60 and, as such, may not need to be removed during or after formation).

With embodiments, such as generally illustrated in FIGS. 9, 9A, 9B, 9C, and p10, a swaging tool 10 may include a valve 80 (e.g., a fluid valve) that may be configured to facilitate or ensure a correct positioning/alignment of a fluid conduit 100 and/or a fitting 200 (e.g., in retainer 22). For example and without limitation, disposing a fluid conduit 100 and/or a fitting 200 in retainer 22 may include fluid conduit 100 and/or a fitting 200 contacting, directly or indirectly, a valve stem or poppet 82 of valve 80. Upon complete connection/proper alignment of fluid conduit 100 and/or a fitting 200 with retainer 22, valve stem 82 may move (e.g., downward) to open valve 80, which may allow pressurized fluid P to pass through valve 80. The pressurized fluid P may be used, for example, to actuate actuator 50, such as via one or more fluid passages 28, such as internal fluid passages, that may be formed (e.g., via additive manufacturing) in body 20. In such example configurations, actuator 50 may not be actuated until a fluid conduit 100 and/or a fitting 200 is sufficiently or completely connected/properly aligned with retainer 22 so that pressurized fluid P can be provided to actuator 50 through valve 80. Valve stem 82 may translate or move, for example, in a direction generally perpendicular to a connection direction of a fluid conduit 100 and/or a fitting 200 (e.g., perpendicular to axes 100A, 200A). Valve 80 and/or body 20 may include a valve retainer 30 that may be configured to retain valve 80 relative to body 20. Body 20 may include a vent 32 that may be formed (e.g., via additive manufacturing) to be disposed at a rear/bottom of valve stem 82. Valve 80 may be configured as a poppet valve. Body 20 may include a recess 34 that may be configured to receive a valve 80. Recess 34 may be connected to a first portion 28A (e.g., an inlet portion) of a fluid passage 28 and/or a second portion 28B (e.g., an outlet portion) of a fluid passage 28.

Figure 10:
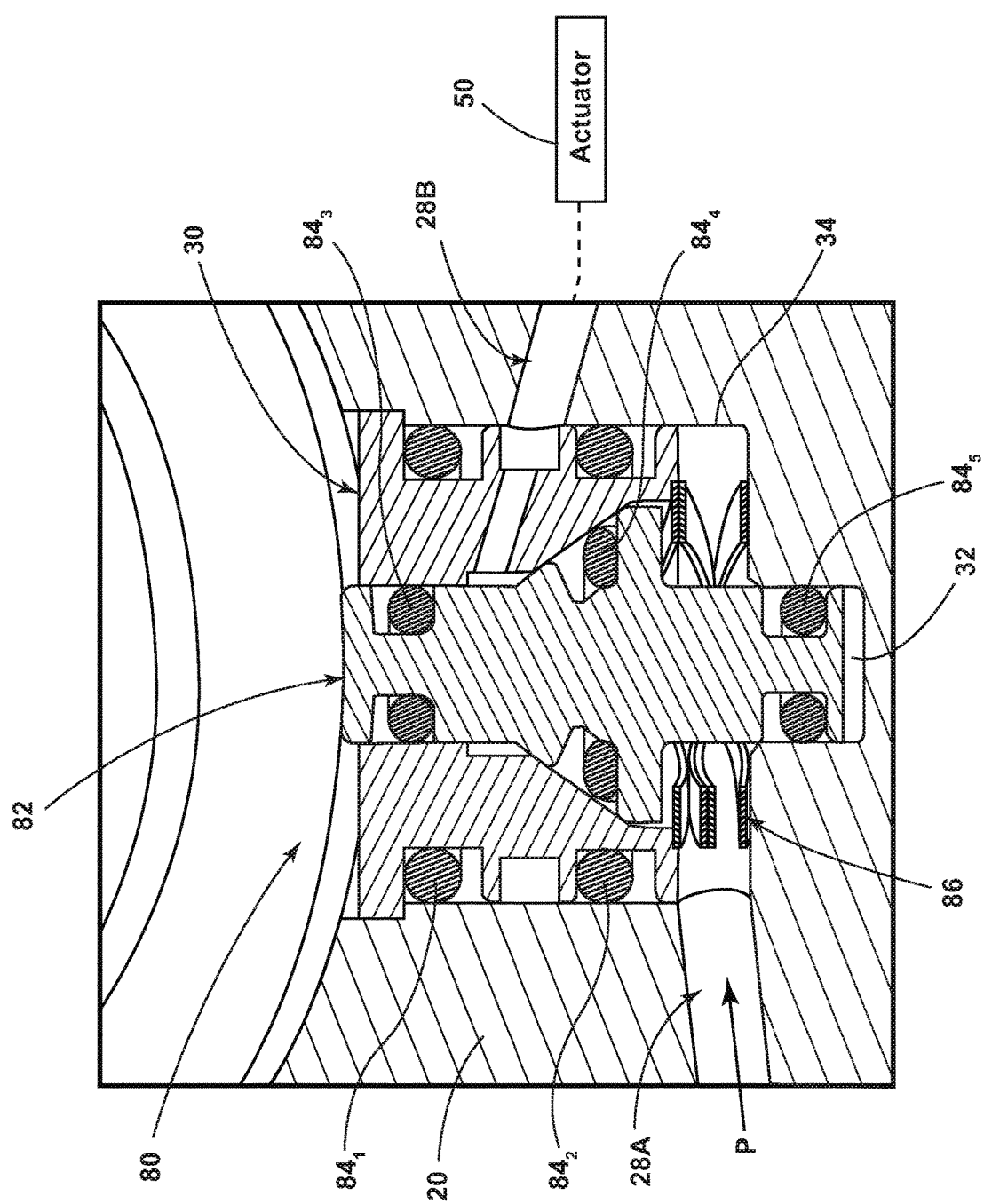
FIG. 10 is a cross-sectional view of portions of an embodiment of a swaging tool, including a valve in a closed position, according to teachings of the present disclosure.
Figure 11:
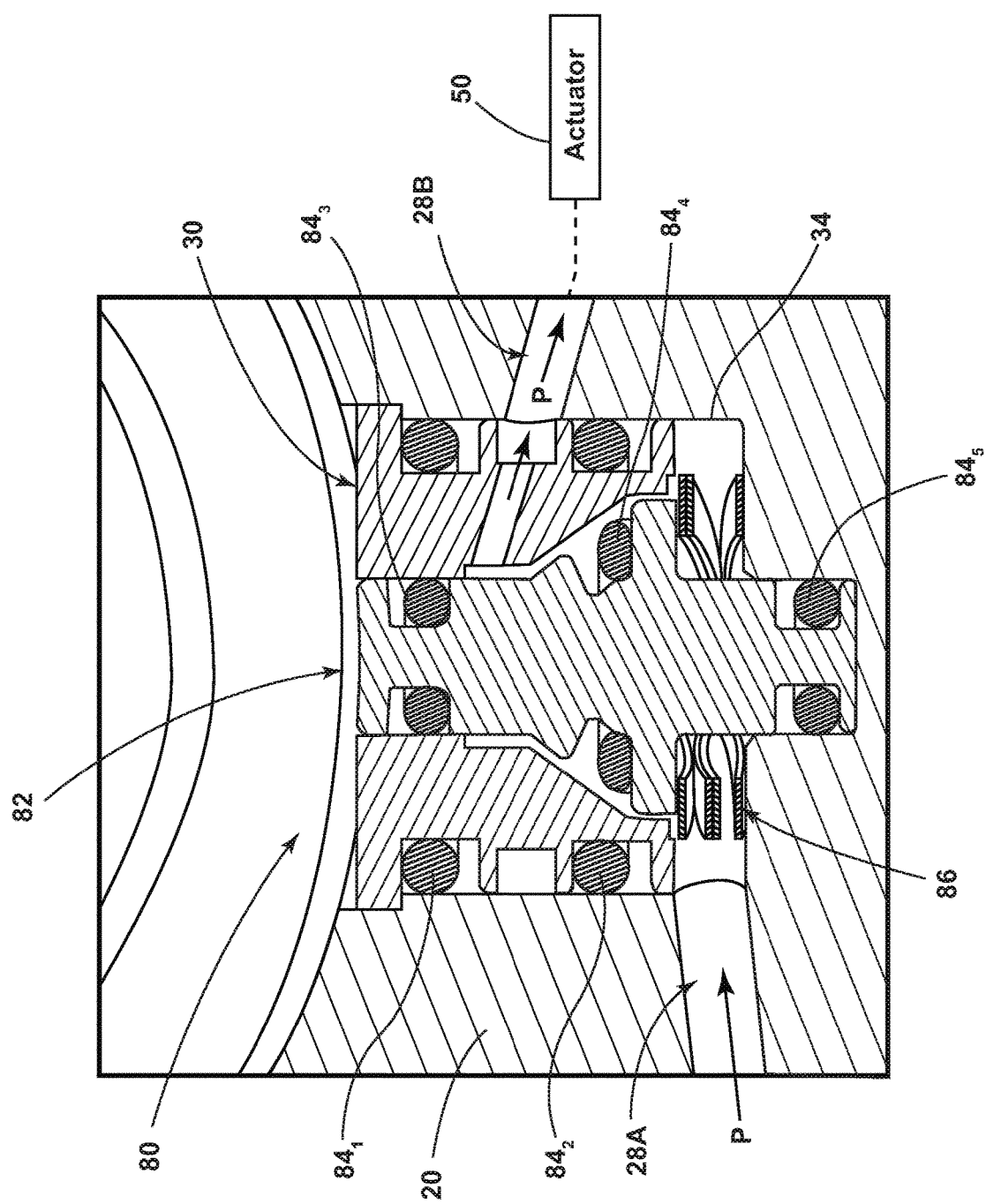
FIG. 11 is a cross-sectional view of portions of an embodiment of a swaging tool, including a valve in an open position, according to teachings of the present disclosure.

In embodiments, a valve 80 may control fluid flow between first portion 28A and second portion 28B through recess 34. In a first/closed position of valve 80, valve stem 82 may be disposed such that fluid may not flow through recess 34 between first portion 28A and second portion 28B (e.g., valve stem 82 may be in sealing contact with valve retainer 30, such as generally illustrated in FIG. 10), and may not actuate actuator 50. In a second/open position of valve 80 (see, e.g., FIG. 11), valve stem 82 may be disposed such that fluid may flow through recess 34 between first portion 28A and second portion 28B, which may permit actuation of actuator 50. For example and without limitation, in an open position of valve 80, fluid may flow from first portion 28A into recess 34, between retainer 30 and valve stem 82, through a fluid passage 36 in retainer 30, into second portion 28B, and/or to actuator 50. First portion 28A may connect a fluid source with the valve 80. Second portion may connected valve 80 with actuator 50.

In embodiments, a valve 80 may include one or more sealing members 84, such as O-rings. For example and without limitation, a first sealing member 841 and a second sealing member 842 may be disposed between valve retainer 30 and body 20, a third sealing member 843 and a fourth sealing member 844 may be disposed between valve stem 82 and valve retainer 30, and/or a fifth sealing member 845 may be disposed between valve stem 82 and body 20. A biasing member 86, such as a wave spring, may be disposed in recess 34 and/or between body 20 and valve stem 82 and may bias valve stem 82 toward a closed position.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A method of manufacturing a swaging tool, the method comprising:
    forming a body of the swaging tool and a retainer extending from the body via additive manufacturing such that the body has one or more depressions formed at least one of internally and/or externally and includes an internal lattice structure, and the retainer has an opening to receive and retain at least one of a fluid fitting and a fluid conduit;
    disposing a fluid valve at least partially in the body in such a manner that the fluid valve opens when the at least one of a fluid fitting and a fluid conduit is in complete connection and proper alignment with the retainer;
    disposing a valve stem of the valve to contact the at least one of a fluid fitting and a fluid conduit when the at least one of a fluid fitting and a fluid conduit is in complete connection and proper alignment with the retainer;
    forming a jaw of the swaging tool, the jaw having one or more depressions formed at least one of internally and/or externally; and
    connecting the jaw with the body.

2. The method of claim 1, wherein forming the jaw includes providing a portion of the jaw with a lattice structure.

3. The method of claim 2, wherein the lattice structure of the jaw and/or the body is not externally accessible.

4. The method of claim 1, wherein forming the body includes adding material to form at least one recess in an outer surface of the body.

5. The method of claim 4, comprising conducting a stress analysis, wherein the at least one recess is formed based on or according to the stress analysis.

6. The method of claim 1, wherein forming the jaw includes forming the jaw, at least in part, via additive manufacturing.

7. The method of claim 1, wherein the body is monolithic and the jaw is monolithic.

8. The method of claim 1, wherein connecting the jaw with the body includes forming the jaw via additive manufacturing.

9. The method of claim 1, including disposing an actuator at least partially in the body.

10. The method of claim 9, wherein forming the body includes adding material to form an internal fluid passage to connect the fluid valve and the actuator.

11. A swaging tool, comprising:
a body including an internal lattice structure;
a retainer configured to retain at least one of a fluid fitting and a fluid conduit, the retainer extending from the body and having an opening to receive the at least one of a fluid fitting and a fluid conduit;
a jaw connected to the body; and
a fluid valve disposed at least partially in the body, the fluid valve being configured to open when the at least one of a fluid fitting and a fluid conduit is in complete connection and proper alignment with the retainer;
wherein the body and the jaw each has one or more depressions formed at least one of internally and/or externally; and a valve stem of the valve is disposed to contact the at least one of a fluid fitting and a fluid conduit when the at least one of a fluid fitting and a fluid conduit is in complete connection and proper alignment with the retainer.

12. The swaging tool of claim 11, wherein the body includes a recess in which the fluid valve is disposed.

13. The swaging tool of claim 11, wherein the fluid valve is a poppet valve.

14. The swaging tool of claim 12, wherein the body includes an internal fluid passage, and when the fluid valve is open, pressurized fluid is flowable from a first portion of the internal fluid passage through the recess to a second portion of the internal fluid passage.

15. The swaging tool of claim 13, wherein a poppet of the valve is configured to be moved from a closed position to an open position when said at least one of a fluid fitting and a fluid conduit is in complete connection and proper alignment with the retainer.

16. The swaging tool of claim 11, including an actuator configured to actuate the jaw, wherein the valve controls movement of the actuator.

17. The swaging tool of claim 16, wherein the body includes an internal fluid passage connecting the valve with the actuator.

18. The swaging tool of claim 11, wherein the body is monolithic and the jaw is monolithic.

19. The swaging tool of claim 11, wherein the body is configured for connection with a plurality of inserts configured to engage fluid fittings of different sizes.

* * * * *